J. EICHNER.
ADJUSTING AND LOCKING DEVICE FOR AUTOMOBILE CHAINS.
APPLICATION FILED NOV. 11, 1916.
1,256,538. Patented Feb. 19, 1918.
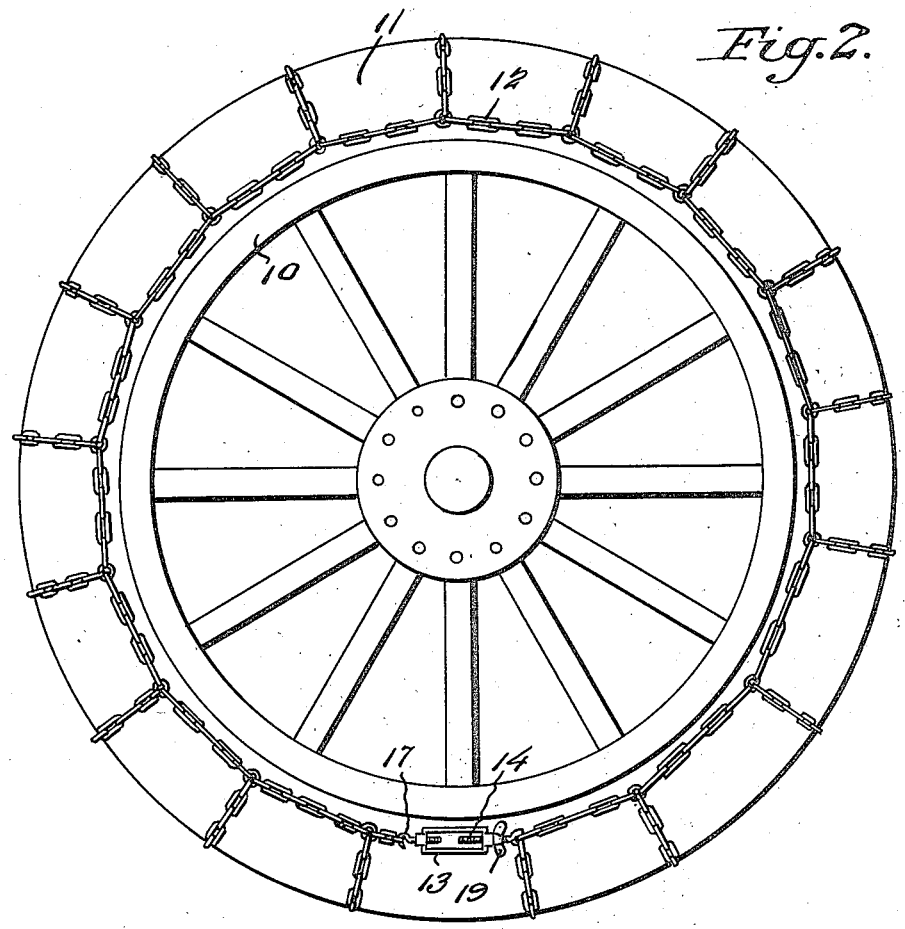
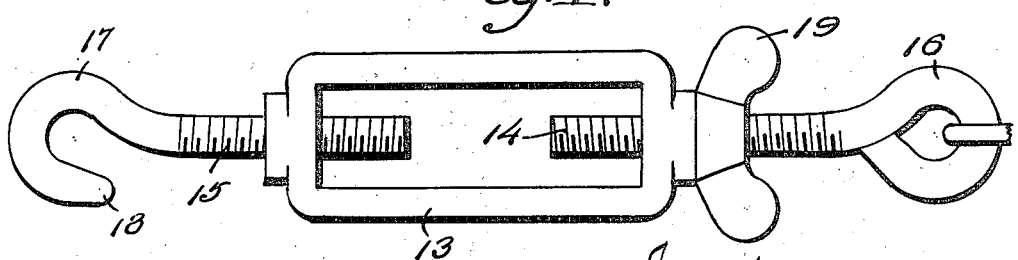

UNITED STATES PATENT OFFICE.

JOHN EICHNER, OF VAN METER, IOWA.

ADJUSTING AND LOCKING DEVICE FOR AUTOMOBILE-CHAINS.

1,256,538. Specification of Letters Patent. Patented Feb. 19, 1918.

Application filed November 11, 1916. Serial No. 130,903.

*To all whom it may concern:*

Be it known that I, JOHN EICHNER, a citizen of the United States, residing in Van Meter, county of Madison, and State of Iowa, have invented a new and useful Improvement in Adjusting and Locking Devices for Automobile-Chains, of which the following is a specification.

The object of my invention is to provide means, simple, strong, durable and inexpensive, in construction, for securing, and adjusting the tension of, chains designed to be attached to automobiles, and the like, to prevent skidding. I am aware that many locking and securing devices have been invented and used for this purpose, but thus far no satisfactory means has been used for tightening the tension of the chains after they have been secured to the wheels, and it is that object I desire to attain.

My invention consists of certain details of construction hereinafter set forth, pointed out in my claim, and illustrated in the accompanying drawing, in which Figure I shows a detail view, in elevation of my device; and Fig. II shows a chain, fitted out with my securing and adjusting device, mounted on the casing of an automobile wheel.

Referring to the accompanying drawing the reference numeral 10 is used to indicate an automobile wheel, and 11 the casing attached thereto. The numeral 12 indicates a chain, of the ordinary type with two parallel chains joined by cross sections of chains, the ends of each chain being joined with my improved device. My device consists of the main member 13, substantially rectangular in conformation, its two end sections being provided with screw threaded openings to receive the screw threaded shafts, 14 and 15 respectively, of the bolts 16 and 17 respectively. The bolt 16 is an eye bolt, as shown, permanently secured to one end of the chain, the shaft thereof being threaded into its opening in the member 13, and the bolt 17 is provided with a hook 18 on its outer end, by means of which it is designed to be secured to the desired link in the chain 12. Obviously the bolts 16 and 17, and the member 13, are always secured to one end of the chain 12, and when the chain is fitted to the wheel the hook 18 secures the two ends thereof together.

The numeral 19 indicates a thumb nut mounted on the shaft 14, and designed as a lock to hold the member 13 in position, at any desired point, on the shaft 14.

In practical operation the chain is fitted to the wheel and then the member 13 rotated on the shafts 14 and 15, drawing them together so as to secure a tight tension on the chain. The thumb nut 19 is then rotated on the shaft 14, to contact with the end of the member 13 thus forming a lock to hold the said member against turning.

Having thus described my invention, what I claim and desire to secure by Letters Patent of the United States, is:

A chain lock and adjuster for tire non-skid chains, composed of a substantially rectangular member having a screw threaded opening in each end thereof, a hook bearing shaft threaded into one of said openings, an eye bearing shaft threaded into the other opening, and a nut threaded over the eye bearing shaft and abutting the outer face of the adjacent end of said rectangular member to hold the latter against turning, said nut having wings formed to engage the side of the tire so as to be itself held against rotation thereby.

JOHN EICHNER.

Witnesses:
F. MOENCK,
A. B. STUART.